3,160,768
MAGNETOHYDRODYNAMIC GENERATOR
Heinz Goeschel and Friedrich Burhorn, Erlangen, Germany, assignors to Siemens-Schuckertwerke Aktiengesellschaft, Berlin-Siemensstadt, Germany, a corporation of Germany
Filed June 19, 1962, Ser. No. 203,626
Claims priority, application Germany June 20, 1961
7 Claims. (Cl. 310—11)

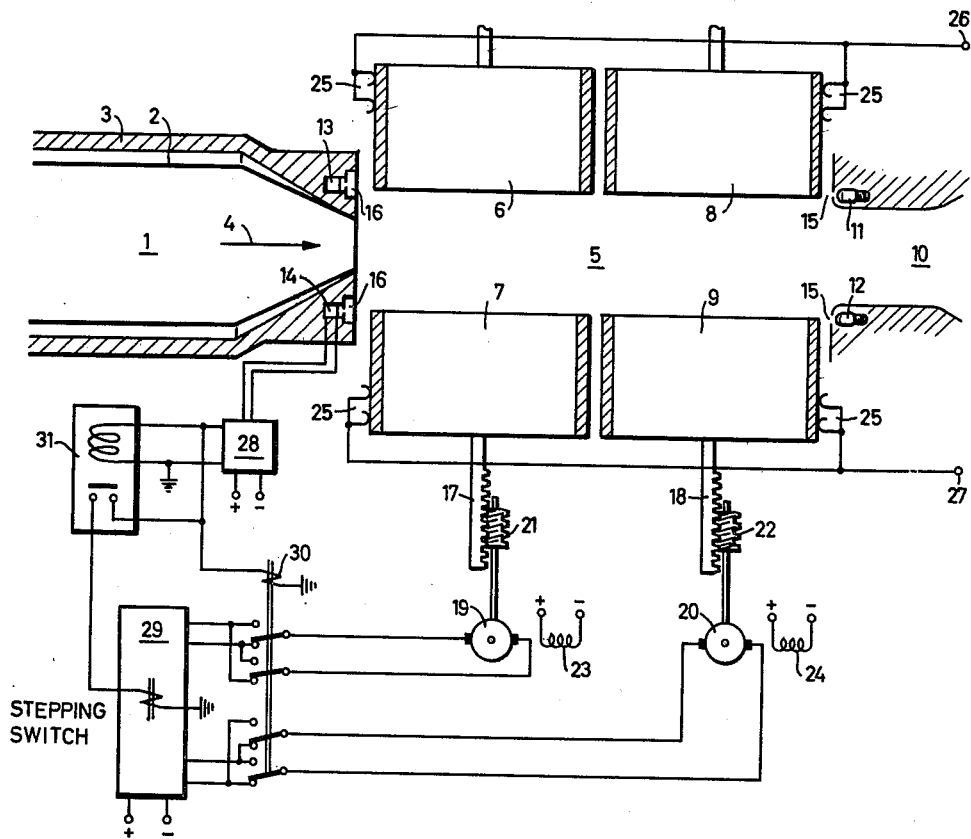

Our invention relates to magnetohydrodynamic (MHD) generators for direct conversion of thermal energy into electrical energy.

A known design of such MHD generators comprises a channel structure of approximately square duct cross-section traversed, during operation, by an ionized gaseous medium, for example hot combustion gases containing an addition of potassium. A magnetic field passing transversely through the duct causes the generation of a voltage between electrodes constituted by respective opposite lateral walls of the channel structure. The generated voltage is dependent upon the speed of the flowing medium, the intensity of the magnetic field and the mutual spacing of the electrodes.

From technological viewpoints the high temperature in the interior of the MHD generator places extremely exacting requirements upon the material of the channel structure and particularly upon the electrodes. It must be taken into account that the electrodes will burn off and become gradually consumed during operation of the generator. For maintaining the operating values of the generator substantially constant, it has been suggested that graphite electrodes be employed and fed forward automatically so as to maintain a constant interelectrode spacing.

However, considerable difficulties are encountered when attempting to realize this proposal in practice. The consumption rate of the electrodes can be looked upon as being uniform only in coarse approximation. Hence a time-proportional control of the electrode feed motion is not satisfactory during prolonged periods of operation. This also applies to voltage-proportional or current-proportional controls. For properly regulating the electrode positions, a measure indicative of the spacing between the electrodes within the channel structure would be required, but such measure is not readily available due to the construction particularities of MHD generators. At best, attempts at measuring the electrode spacing as a function of the electrode voltages are promising only with a single pair of electrodes but fail as soon as several electrode pairs are arranged along the channel structure and are electrically connected with each other in series or parallel relation. Furthermore, simply measuring the electrode spacing does not afford the assurance that the electrodes remain symmetrical to the center axis of the channel.

It is an object of our invention to devise means for operationally determining the electrode positions and to thereby afford a satisfactory solution of the problem to replenish the electrode consumption in MHD generators by feed regulation.

To this end, and in accordance with a feature of our invention, we provide an MHD generator with a photoelectric barrier for setting a datum position of the electrodes, and we further provide the electrodes with feed drives and appertaining regulating devices of periodic operation which advance the electrodes in intermittent intervals of time toward the photoelectric barrier.

The barrier is preferably constituted, on the one hand, by a light source whose radiation is, at least partially, outside of the range of wave lengths or frequencies of the radiation issuing from the ionized gaseous medium, and, on the other hand, by a photoelectric receiver insensitive to the just-mentioned range of wave lengths or frequencies. Since, as a rule, the temperature of the ionized medium (plasma) is about 3000° K., various radiation sources are readily available whose spectrum satisfies the just-mentioned requirements. If desired, filters may be used for increasing the sensitivity in the frequency range of particular interest.

According to another feature of our invention, the regulating device, for an MHD generator having a plurality of electrode pairs, is so controlled by the photoelectric cell or other receiver that an electrode, after being fed toward the barrier and after having thus intercepted the light beam, is momentarily pulled back just sufficiently to release the light beam again so that the latter is available for a pre-feeling feeder motion of the next electrode in the direction toward the beam. The regulating device may be provided with a stepping mechanism for periodically initiating the just-mentioned feeder movements of the electrodes. This stepping mechanism therefore consists of an electric stepping switch or stepping motor controlled by the photoelectric receiver.

The rate of the electrode feeder motion depends upon the particular material employed for the electrodes. For graphite electrodes a burn-off in the order of about 1 mm. per minute can be taken into account, and the average rate of feed is preferably set accordingly. Instead of graphite, other highly refractory materials, such as tungsten carbide or tantalum carbide, are applicable as electrode material.

It is of particular advantage, for the purposes of the invention, to apply the Soederberg method, known from arc furnaces, to MHD generators according to the invention. For this purpose, sinterable, electrically conducting substances in pulverulent form are filled into a tube and the tube is used as electrode. At the front face, the filled-in material becomes sintered due to the high temperature in the interior of the generator so that a firm electrode surface exists at this location. The generated current can be taken from the tube jacket which becomes consumed together with the electrode material proper, due to melting of the tube material. In the course of operation, further tubes are successively connected to the first tube as needed, so as to provide for continuous replenishment of the electrode. The invention opens up a new and advantageous field of application for electrodes of this type.

In all cases it is generally of advantage to set the rate of replenishing feed motion for the electrodes approximately to the order of the rate of consumption in order to prevent excessive agitation of the regulating device.

For further explaining the invention, reference will be made in the following to the embodiment of an MHD generator system according to the invention schematically illustrated by way of example on the accompanying drawing.

For simplicity, the illustrated example shows an MHD generator with only two electrode systems, comprising a total of four electrodes, although it will be understood that the system can be enlarged readily to more than two electrode systems.

Denoted by 1 is the right-hand end of a combustion chamber composed of an inner jacket 2 and an outer shell 3 perpiherally spaced from each other. The interspace between the jacket 2 and shell 3 is traversed by liquid coolant, for example water. The hot and ionized combustion gases leave the chamber 1 in the direction of the arrow 4 and enter into the duct 5 of the generator channel structure which has approximately rectangular cross section and whose lateral walls are formed by electrodes 6, 7, 8 and 9. The other walls of the duct are constituted or covered by highly refractory insulating material. The channel space is traversed by a magnetic field in a direction perpendicular to the plane of illustration. The channel, of course, is provided with suitable seals so as to be gas-tightly and pressure-tightly closed against the environment in the known manner. Located at the end of the channel is a likewise water-cooled duct 10 through which the gases issue from the MHD generator into a flue or into heat exchanging equipment for utilization of their remaining heat content.

Two photoelectric barriers are provided lengthwise of the channel for the purpose of determining the desired datum position for the electrodes. For this purpose, two or more light sources 11, 12 are mounted in the duct structure 10, and corresponding photoelectric receivers or cells 13, 14 are mounted on the channel-adjacent side of the combustion chamber. The photoelectric barriers or systems also comprise diaphragms 15 and suitable filters 16 which determine the frequency range of radiation to be utilized for the control and regulation of the electrode feed period. Reflectors (not shown) direct the light beams of the light sources at the appropriate corresponding photocells.

Each electrode is provided with its own drive schematically represented in the drawing by a rack 17 or 18 and a worm 21 or 22 on the shaft of a drive motor 19 or 20. The drive motors are shown to be direct-current motors whose field windings 23, 24 receive constant excitation by direct current and whose direction of rotation can be reversed by reversing the flow of current passing through the armature. The speed of the feed motion can be preselected by correspondingly adjusting the voltage supply to the field windings 23, 24.

The electrodes 6, 7, 8, 9 cooperate with respective banks of slide contacts 25 which are connected by busses with respective terminals 26 and 27 at which the generated voltage of the MHD generator is available.

The regulating device for the electrode drives comprises a control unit 28, a stepping switch 29 and a reversing contactor 30. Connected between the control unit 28 and the stepping switch 29 is a NOT gate 31 which issues a signal to its output terminal only when no signal is applied to the input terminals.

The performance of the illustrated embodiment is as follows:

The stepping switch 29 alternately applies voltage to its upper and lower output circuits, constituting in part the upper and lower group of taps. Assume that the upper output circuit carries voltage. Then the motor 19 runs in the forward feed direction of the electrode 7 and shifts the electrode toward the center of the channel until the front face of the electrode reaches the barrier constituted by the beam of light between the source 12 and the receiver 14, thus intercepting the light beam. At this moment, the control unit 28, which may comprise a conventional amplifier and pulse generator, issues a signal to the NOT gate 31 so that the output signal of the gate 31 vanishes and the energizing coil of the stepping switch 29 is switched off. At the same time, a signal from control unit 28 causes the reversing contactor 30 to pick up so that the motor 19 is reversed and moves the electrode 7 in the reverse direction. As soon as the front edge of the electrode releases the light beam, the output signal of control unit 28 vanishes so that the NOT gate 31 resumes issuing a signal and causes the stepping switch 29 to now place voltage upon its lower output circuit. At the same time the reversing contactor 30 drops off, so that the circuits for forward feed are prepared for both motors 19 and 20. However, since the upper output circuits of the stepping switch 29 are without voltage, only the motor 20 will now start running and move the electrode 9 forward toward the center of the generator channel. This again constitutes essentially a pre-feeling movement toward the photoelectric barrier, whereafter the electrode is again moved in the reverse direction for releasing the light beam. Upon completion of this cycle both electrodes 7 and 9 are properly set to the datum positions.

An identical regulating device is provided for the electrodes 6 and 8 or their respective drives. If the generator is equipped with further electrode systems, the stepping switch 29 is to be provided with a correspondingly greater number of output circuits to be sequentially energized. In all cases the feeder movement of the electrodes takes place automatically and in sequence. When the electrode consumption has progressed to such an extent that the original electrode must be replenished, another electrode block is attached to the remainder of the original electrode and the drive, if necessary, is correspondingly reset. This applies to electrodes of graphite and similar material, as well as for electrodes comprising a tubular jacket filled with sinterable electrode material.

MHD generator systems according to the invention can be modified in various respects. Thus, the forward feed motion of sequential electrodes can be set to occur in respective intervals of time rather than in an immediate time sequence. For materials having a very slight rate of consumption it is sometimes sufficient to initiate a feed motion at increased rate only a longer interval of time and to permit a prolonged pause upon each correction in the position of all electrodes until initiating the next following correction.

With respect to design and operational details of MHD generators applicable in conjunction with, but not essential to, our invention, reference may be had, if desired, to the following copending application assigned to the assignee of the present invention, as well as to the reference literature mentioned in that application: Application of Wilhelm Kafka, Serial No. 200,471, filed June 6, 1962.

The light sources 11 and 12 are preferably mercury arc lamps having a main output at a wave length of 2537 Angstroms. The photoelectric filters 16 are preferably of the type known as "Schottfilter UG5" having a thickness of 2 mm., plus a chlorine gas filter having the parameters $p \cdot d = 20$, wherein $p$ is the pressure measured in atmospheres and $d$ is measured in centimeters. An example of such a chlorine gas filter is one operating at 10 atmospheres with a 2-centimeter thickness through which radiation passes. Such a filter passes .25 of the main (i.e. peak) wave length in the mercury arc lamp. All other wave lengths are essentially suppressed. A normal selenium cell can be located directly behind the filter.

With regard to the above, reference may be had to the Taschenbuch für Chemiker und Physiker by D'Ans-Lax, Sec. 643.

While embodiments of the invention have been described in detail, it will be obvious to those skilled in the art that the invention may be embodied otherwise within the scope of the following claims.

We claim:

1. A magnetohydrodynamic generator comprising elongated plasma generating means, magnetic means for producing a magnetic field transverse to the length of the plasma-generating means, said plasma-generating means including opposite lateral elongated walls having opposing electrode pairs displaceable toward each other for compensating wear of said electrodes, a photoelectric system extending along the interior of said plasma-generating means and defining a datum position for the electrodes, electrode drive means for each electrode, and a regulating device responsive to the photoelectric system and connected to said respective drive means for periodically advancing the electrodes toward the datum position as said electrodes become worn.

2. A magnetohydrodynamic generator comprising elongated plasma-generating means, magnetic means for producing a magnetic field transverse to the length of the plasma-generating means, said plasma-generating means including opposite lateral elongated walls having opposing electrode pairs displaceable toward each other for compensating wear of said electrodes, a photoelectric system in the interior of said plasma-generating means and including a light source on one side of an electrode having a radiation frequency which is at least partly outside of the range of the radiation from the ionized medium, said system including a photoelectric receiver on the other side of said electrode and insensitive to said frequency range and responsive to the light source for forming a datum position for said electrodes, electrode drive means for each electrode, and a regulating device responsive to the photoelectric receiver and connected to said respective drive means for periodically advancing the electrodes toward the datum position.

3. A magnetohydrodynamic generator comprising elongated plasma-housing means, magnetic means for producing a magnetic field transverse to the length of the plasma-housing means, said plasma-housing means including opposite lateral elongated walls having opposing electrode pairs displaceable toward each other for compensating wear of said electrodes, a photoelectric system extending along the interior of said plasma-housing means and defining a datum position for the electrodes, electrode drive means for each electrode, and a regulating device responsive to the photoelectric system and connected to said respective drive means for periodically advancing the electrodes toward the datum position, said photoelectric system including a light source on one side of an electrode and having a radiation frequency which is at least partly outside of the wave range of the radiation from the ionized medium, said system including a photoelectric receiver on the other side of said electrode and insensitive to this range and responsive to the light source for defining the datum of said system, said regulating device having control means connected to the photoelectric receiver for withdrawing said electrode from between said source and said receiver after said electrode is advanced beyond the datum established between the source and receiver.

4. A magnetohydrodynamic generator comprising elongated plasma-generating means, magnetic means for producing a magnetic field transverse to the length of the plasma-generating means, said plasma-generating means including opposite lateral elongated walls having opposing electrode pairs displaceable toward each other for compensating wear of said electrodes, a photoelectric system extending along the interior of said plasma-generating means and defining a datum position for the electrodes, electrode drive means for each electrode, and a regulating device responsive to the photoelecric system and connected to said respective drive means and having a stepping mechanism for periodically advancing the electrodes toward the datum position, said photoelectric system including a light source on one side of an electrode and having a radiation frequency which is at least partly outside of the wave range of the radiation from the ionized medium, said system including a photoelectric receiver on the other side of said electrode and insensitive to this range and responsive to the light source.

5. A magnetohydrodynamic generator comprising elongated plasma-containing means, magnetic means for producing a magnetic field transverse to the length of the plasma-containing means, said plasma-containing means including opposite lateral elongated walls having opposing electrode pairs displaceable toward each other for compensating wear of said electrodes, a photoelectric system extending along the interior of said plasma-containing means and including a light source on one side of said electrodes having a radiation frequency which is at least partly outside of the wave range of the radiation from the ionized medium, said system including a photoelectric receiver on the other side of said electrodes and insensitive to this range and responsive to the light source for establishing therewith a datum position for the electrodes, electrode drive means for each electrode, and a regulating device responsive to the photoelectric system having a stepping mechanism sequentially connected to each electrode drive means for advancing one electrode at a time toward the datum position each time the feed of the preceding electrode is completed, said regulating device having control means connected to the photoelectric receiver for withdrawing said electrode from between said source and said receiver after said electrode is advanced between the source and receiver.

6. A magnetohydrodynamic generator comprising elongated plasma-generating means, magnetic means for producing a magnetic field transverse to the length of the plasma-generating means, said plasma-generating means including opposite lateral elongated walls having opposing electrode pairs displaceable toward each other for compensating wear of said electrodes, a photoelectric system extending along the interior of said plasma-generating means, said photoelectric system including a light source on one side of an electrode and having a radiation frequency which is at least partly outside of the wave range of the radiation from the ionized medium, said system including a photoelectric receiver on the other side of said electrode and insensitive to this range and responsive to the light source for defining a datum position for the electrodes, electrode drive means for each electrode, and a regulating device responsive to the photoelectric system and connected to said respective drive means for periodically advancing the electrodes toward the datum position, said regulating device having control means connected to the photoelectric receiver for withdrawing said electrode from between said source and said receiver after said electrode is advanced between the source and receiver and a stepping mechanism sequentially connected to each electrode drive means for feeding one electrode each time the feed of the preceding electrode is completed, said stepping mechanism being connected to and controlled by said photoelectric receiver.

7. A magnetohydrodynamic generator comprising elongated plasma-generating means, magnetic means for producing a magnetic field transverse to the length of the plasma-generating means, said plasma-generating means including opposite lateral elongated walls having opposing electrode pairs displaceable toward each other for compensating wear of said electrodes, a photoelectric system extending along the interior of said plasma-generating means and defining a datum position for the electrodes, electrode drive means for each electrode, and a regulating device responsive to the photoelectric system and connected to said respective drive means for periodically advancing the electrodes toward the datum position, said electrodes consisting of tubular structures which contain sinterable, electrically conducting material.

References Cited in the file of this patent
UNITED STATES PATENTS

| | | |
|---|---|---|
| 957,242 | Noeggerath | May 10, 1910 |
| 1,977,341 | MacKintosh | Oct. 16, 1934 |